United States Patent [19]

Figge, Sr.

[11] Patent Number: 5,170,007
[45] Date of Patent: Dec. 8, 1992

[54] TAILORABLE ROLL-BONDED INSENSITIVE MUNITIONS CASE

[75] Inventor: Irving E. Figge, Sr., Manassas, Va.

[73] Assignee: Atlantic Research Corporation, Gainesville, Va.

[21] Appl. No.: 775,526

[22] Filed: Oct. 15, 1991

[51] Int. Cl.⁵ .......................... F42B 39/20; F02K 9/38
[52] U.S. Cl. .................................... 102/481; 60/223; 60/253
[58] Field of Search .................. 102/481, 473; 60/223, 60/253

[56] References Cited

U.S. PATENT DOCUMENTS

| | | | |
|---|---|---|---|
| 3,194,158 | 7/1965 | Paul, Jr. | 102/406 |
| 3,665,857 | 5/1972 | Radnich et al. | 102/481 |
| 3,992,997 | 11/1976 | McCubbin et al. | 102/481 |
| 4,041,869 | 8/1977 | San Miguel | 102/481 |
| 4,411,199 | 10/1983 | Yates et al. | 102/481 |
| 4,458,482 | 7/1984 | Vetter et al. | 102/481 |
| 4,478,151 | 10/1984 | Vetter et al. | 102/481 |
| 4,494,373 | 1/1985 | Vetter. et al. | 102/481 |
| 4,615,272 | 10/1986 | Aubert | 102/481 |
| 5,044,154 | 9/1991 | English, Jr. et al. | 60/223 |

Primary Examiner—Charles T. Jordan
Attorney, Agent, or Firm—Frank P. Presta

[57] ABSTRACT

A tailorable, roll-bonded, insensitive munitions motor case and method of production. The motor case comprises a sheet of fiber reinforced thermoplastic, thermoset or other suitable material rolled to form a case with a tubular configuration having at least one layer of material, and a coating of adhesive on at least part of said sheet for bonding the sheet to itself for maintaining the tubular configuration. The adhesive has a bond-strength breakdown temperature which is below the autoignition temperature of the housed propellant, thereby enabling the case to separate and un-roll when the breakdown temperature is reached to preclude dangerous propellant pressurization within the case. The method of production includes the steps of applying an adhesive to the sheet, rolling the sheet around a cylindrical tool to form a tubular case having at least one layer, and curing the case. Preferably the case is cured while on a tool which has a coefficient of thermal expansion which is greater than that of the sheet. Also, the sheet may be rolled such that there is a longitudinal section of the case which has one less layer of material than the remainder of the case, thereby to cause the case to fail along the longitudinal section if over-pressurization should occur.

17 Claims, 2 Drawing Sheets

TAILORABLE ROLL-BONDED INSENSITIVE MUNITIONS CASE

BACKGROUND OF THE INVENTION

The present invention relates to a roll-bonded munitions motor case and, more particularly, to such a case that is constructed to structurally degrade when exposed to an abnormally high temperature below the autoignition temperature of the encased propellant.

The destructive capability of explosive munitions is intended to be directed against an aggressor. However, this same lethal and/or damaging potential can result in the loss of manpower and capability of our own forces in the event that the munition is mishandled, subject to fuel fire and/or cook-off conditions, or projectile and/or shock scenarios. Furthermore, the propagation of the damaging reaction from the initiating munition to adjacent material and munitions can greatly enhance the severity of damage.

Therefore, a need has been created for an economical, reliable and tailorable munitions case which provides the necessary structural integrity under normal conditions essential to its primary mission, while allowing structural degradation when the case reaches a predetermined, abnormal elevated temperature which is below the autoignition temperature of the encased propellant, thereby precluding dangerous propellant pressurization within the case. The roll-bonded munitions motor case and method of production of the present invention meet this need.

BRIEF DESCRIPTION OF THE PRIOR ART

Various munitions motor cases provided with fire exposure safety features are known in the patented prior art as evidenced by the patents to Radnich et al No. 3,665,857 and Vetter et al No. 4,494,373.

The patent to Radnich et al discloses a rocket motor case provided with a safety ejection plug which is sealed to the case by a sealant having a melting temperature lower than that of the autoignition temperature of the encased projectile charge, to enable the plug to be ejected from the case for pressure release when exposed to dangerously high temperature.

The patent to Vetter et al discloses a rocket motor case having a cook-off safety feature, wherein selected portions of the case are structurally strengthened and thermally protected while other selected stress points in the case are left unprotected, thereby causing the case to rupture at the unprotected points for pressure venting if the case is exposed to abnormally high temperatures.

While the prior art motor cases enable some protection against dangerous propellant pressurization, they can be difficult and expensive to manufacture, and often do not provide adequate venting to insure safe release of the propellant energy.

SUMMARY OF THE INVENTION

Accordingly a primary object of the present invention is to provide a tailorable, economical and reliable insensitive munitions capable motor case that will lose its structural integrity upon reaching a predetermined temperature which is below the autoignition temperature of the housed propellant, thereby rendering the case incapable of sustaining sufficient internal pressure to destructively detonate the case.

A more particular object of the present invention to provide a munitions capable motor case for housing a propellant charge comprising a sheet of composite material rolled to form a case with a tubular configuration having at least one layer of material, and a coating of adhesive bonding material on at least part of the sheet for bonding the sheet to itself for maintaining the tubular configuration. The adhesive has a bond-strength breakdown temperature which is below the autoignition temperature of the housed propellant, thereby enabling the sheet to separate and un-roll when the breakdown temperature is reached to preclude dangerous propellant pressurization within the case.

Another object of the present invention is to provide a munitions motor case having a longitudinal section of the case which has one less layer of material than the remainder of the case, thereby causing the case to predictably fail along the longitudinal section if over-pressurization occurs.

Yet another object of the invention is to provide an efficient and economical method of manufacturing a roll-bonded motor case from a sheet of composite material, comprising the steps of applying an adhesive which has a bond-strength breakdown temperature which is below the autoignition temperature of the housed propellant to at least part of the sheet, rolling the sheet around a cylindrical tool or mandrel to form a tubular case having at least one layer of material, and curing the case.

A more particular object of the method includes the step of rolling the sheet onto a tool or mandrel having a coefficient of thermal expansion which is greater than that of the sheet, and heat curing the case while on the tool, thereby causing increased compaction of the case, and providing a gap between the case and the tool after cool-down to facilitate easy removal of the case from the tool.

DESCRIPTION OF THE DRAWING

Other objects and advantages of the subject invention will become apparent from a study of the following specification when viewed in light of the accompanying drawing, in which.

DETAILED DESCRIPTION

Figure 1:
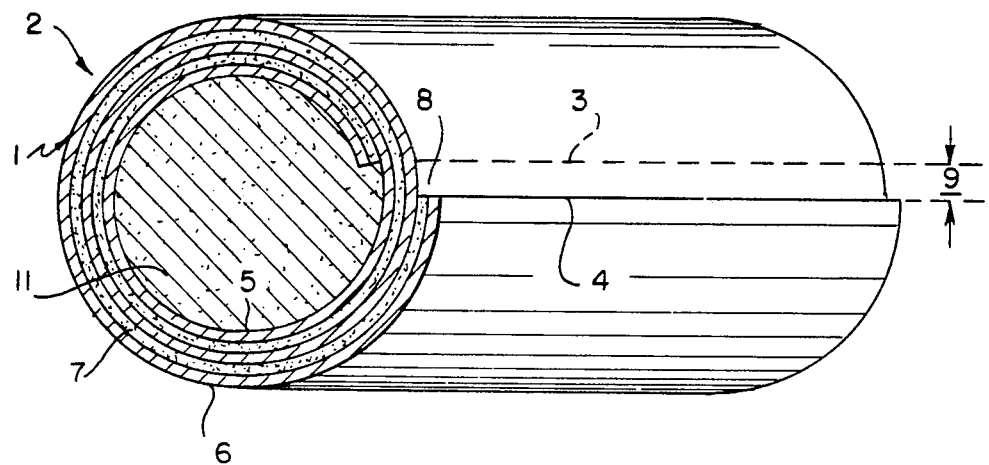
FIG. 1 is a perspective view, partly in section, of the munitions motor case of the present invention.

Referring to FIG. 1, there is shown a roll-bonded motor case comprising a sheet of composite material 1 rolled to form a case 2 having a tubular configuration with at least one layer of material 1. The case 2 is rolled such that a first end 3 of the sheet extends substantially longitudinally on the inner circumference 5 of the case 2 and second end 4 extends substantially longitudinally on the outer circumference 6 of the case. Although, the first end 3 and the second end 4 are shown to extend linearly and longitudinally along the case 2, the sheet 1 may be rolled in a skewed fashion causing the ends 3 and 4 to extend generally longitudinally in a nonlinear spiral fashion along the case 2.

The sheet 1 may be formed of any suitable material capable of functioning as a motor case. The sheet 1 may be a composite fiber reinforced thermoplastic such as polyethylene, polypropylene, nylon, polyethersulfone, polysulfone or fiber reinforced precured thermoset material or the like. The material may be any desired size, thickness, and weave including cloth or unidirectional material. The sheet 1 may be rolled to form a case 2 having any desired number of layers according to the desired structural characteristics of the case 2. Preferably, the sheet 1 is polyethersulfonegraphite fiber reinforced material because of its superior mechanical strength and chemical resistance properties.

A coating of adhesive bonding material 7 is provided on at least part of the sheet 1 between over lapping layers of the sheet 1 for bonding the sheet 1 to itself and maintaining the tubular configuration of the case 2. The adhesive 7 has a bond-strength breakdown temperature which is below the autoignition temperature of the propellant charge 11 which is housed in the case 2. By providing an adhesive 7 which has a bond-strength breakdown temperature which is below the autoignition temperature of the propellant 11 the sheet 1 will be able to separate and un-roll for venting when the breakdown temperature is reached prior to the buildup of dangerous propellant pressurization within the case 2 caused by the heating of the propellant 11. Accordingly, when the breakdown temperature is reached, the case 2 provides for a rapid venting of internal pressure, thereby rendering the case 2 incapable of sustaining sufficient internal, pressure to destructively detonate the propellant 11.

The adhesive 7 may be any suitable adhesive which has good structural strength at room temperature and substantially reduced structural strength at elevated temperatures, and preferably is a low viscosity liquid at room temperature prior to curing. In order to insure that dangerous propellant pressurization does not occur, the adhesive 7 should lose its bond strength at a temperature which is approximately 50° F. below the autoignition temperature of the housed propellant 11. Common propellants used in munitions have an autoignition temperature of approximately 375° F. When such propellants are used, therefore, the adhesive 7 should have a breakdown temperature of approximately 300° to 325° F. to insure safe release of the propellant energy. Preferably, the adhesive 7 should retain substantially its entire bond strength until the breakdown temperature is reached, at which time the adhesive 7 bond strength should degrade rapidly enough to preclude dangerous pressurization. For most scenarios, the adhesive 7 should break down within seconds of reaching its breakdown temperature. As an illustrative example, an adhesive which possesses these desired properties is the epoxy EC-2216 Translucent available from the 3-M Company. EC-2216 Translucent adhesive has a rapid loss of shear strength at approximately 300° F.

Preferably, the case 2 has a plurality of layers, and the first end 3 and second end 4 of the sheet 1 are selectively positioned on the case 2 relative to each other such that there is a circumferential gap 9 between the two ends 3 and 4 which defines a longitudinal section 8 of the case 2 having one less layer than the remainder of the case 2. This will enable the failure position of the case 2 to be predictably determined if overpressurization should occur within the case 2 before sufficient venting is provided. According to the invention, It has been found that the case 2 will predictably fail along the longitudinal section 8, thereby enabling the case 2 to be tailored to have a determinable location at which the propellant 11 will be expelled from the case should the case burst. For example, if a linear longitudinal section 8 having a reduced number of layers is provided, the failure location will be linear and longitudinal along the longitudinal section 8. The size of the gap 9 may be varied according to desired case characteristics.

Figure 2:
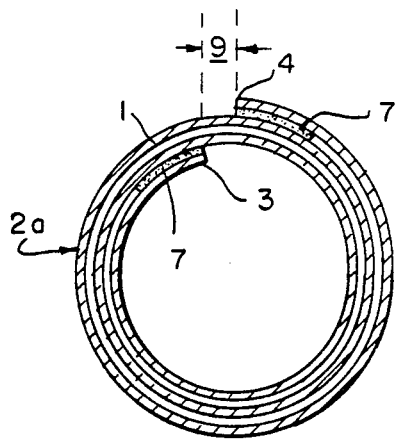
FIG. 2 is an end view in section of an alternative embodiment of the present invention wherein the adhesive is only applied adjacent to the ends of the sheet.

According to the invention, the adhesive 7 may be provided on substantially the entire sheet 1 between the overlapping layers of material, as shown in FIG. 1. It has been found that the case 2 will also provide good internal pressure integrity when the adhesive is provided only at selected locations on the sheet. Referring to FIG. 2, there is shown a motor case 2a of the present invention in which the adhesive 7 is provided only adjacent the ends 3 and 4 of the sheet 1. The internal pressure performance (burst strength) of the case in FIG. 2 is only slightly reduced relative to that of a case having complete adhesive coverage.

Figure 3:
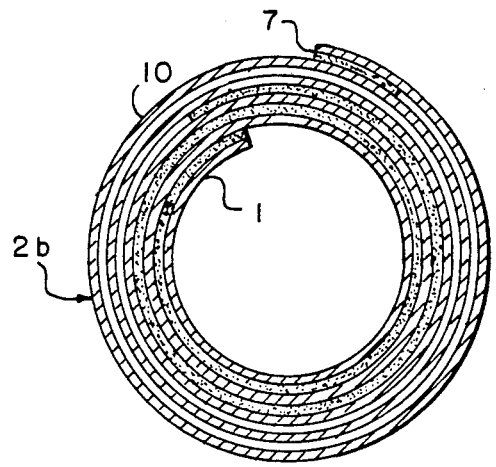
FIG. 3 is an end view of a further embodiment of the present invention which has two sheets of material forming the case.

If desired, a plurality of sheets of material may be used to form the case 2. Referring to FIG. 3, there is shown an embodiment of a motor case of the present invention which has a second sheet 10 of suitable material rolled onto the first sheet 1 to form a case 2b, having a tubular configuration with a plurality of material layers. The first and second sheets are provided with an adhesive on at least part of the sheets for bonding the sheets to each other and to themselves to maintain the tubular configuration. If multiple sheets are used to form the case 2, additional strength can be achieved with a reduced number of layers if the fiber orientation of the sheets are different relative to each other.

Figure 4:
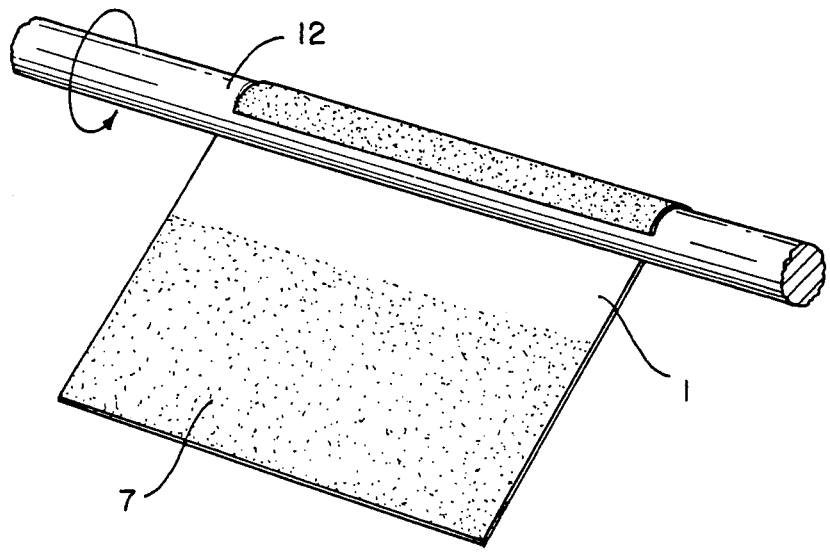
FIG. 4 is a perspective view of the motor case being formed by rolling a sheet coated with adhesive on a tool.
Figure 5:
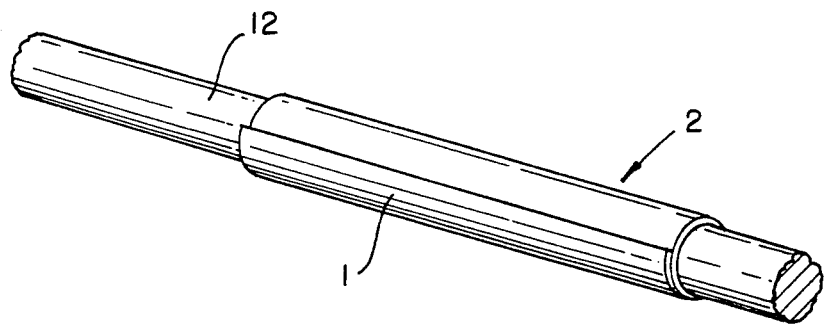
FIG. 5 is a perspective view of the motor case fully rolled on a tool.
Figure 6:
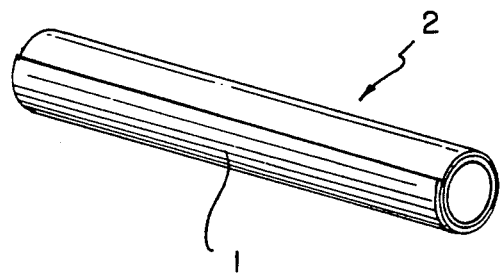
FIG. 6 is a perspective view of the completed motor case after being removed from the tool.

In accordance with the invention, a method of effectively and economically manufacturing a roll-bonded motor case 2 from a sheet of suitable material 1 has been provided. Referring now more particularly to FIGS. 4 through 6, the method includes the steps of selecting an adhesive which has a bond strength temperature which is below the autoignition temperature of the propellant 11 which will be used in the case, applying the adhesive 7 to at least part of the sheet 1 rolling the sheet 1 around a cylindrical tool or mandrel to form to a tubular case 2 having at least one layer of material, and curing the case 2. The rolling step may include selectively rolling a desired number of layers on the tool 12 in accordance with the desired case structural characteristics. Preferably, the method includes the steps of selectively locating the ends of the sheet 1 relative to each other to selectively control the position and mode of failure of the case if it should burst.

Additionally, the sheet 1 may be rolled onto a tool 12 having a coefficient of thermal expansion which is greater than that of the sheet 1, and the case 2 is heat cured while on the tool 12, thereby causing increased compaction of the case 2 and providing a gap between sheet 1 and the tool 12 after cool-down to enable easy removal of the case 2 from the tool 12. In accordance with the desired structural characteristics of the case 2 the adhesive 7 may be selectively applied at desired locations on the sheet 1. Prior to applying the adhesive 7 the surface of the sheet 1 may be prepared and cleaned using a solvent such as methyl ethyl ketone or the like.

The roll-bonded motor case and method of manufacture set forth herein provide a tailorable munitions capable motor case which will provide the structural performance necessary for its primary mission while allowing structural degradation in fuel fire and/or cook-off conditions, thereby precluding dangerous propellant pressurization by venting the case to harmlessly release the propellant energy.

While in accordance with the patent statute, the preferred forms and embodiments of the invention have been illustrated and described, it will be apparent to those of ordinary skill in the art that various changes and modifications may be made without deviating from the inventive concepts set forth above.

What is claimed is:

1. A roll-bonded motor case for housing a propellant charge, comprising a sheet of composite material rolled to form a case with a tubular configuration having inner and outer circumferential surfaces with at least one layer of material therebetween, said sheet having a first end and a second end extending substantially longitudinally along said inner and outer circumferential surfaces of said case, respectively, and a coating of adhesive bonding material on at least part of said sheet for bonding said sheet to itself for maintaining said tubular configuration, said adhesive having a bond-strength breakdown temperature which is below the autoignition temperature of the housed propellant charge, to enable said sheet to separate and un-roll when said adhesive reaches said breakdown temperature, thereby to preclude dangerous propellant pressurization within said case.

2. A motor case as defined in claim 1, wherein said breakdown temperature is approximately 50° F. below the autoignition temperature of the propellant.

3. A motor case as defined in claim 2, wherein said breakdown temperature is between approximately 300° and 325° F.

4. A motor case as defined in claim 1, wherein said adhesive is provided only adjacent to said first and said second ends of said sheet.

5. A motor case as defined in claim 1, wherein said adhesive is provided on substantially the entire sheet.

6. A motor case as defined in claim 1, wherein said adhesive retains substantially its full bond strength until said breakdown temperature is reached, at which time the bond strength breaks down rapidly enough to preclude dangerous propellant pressurization.

7. A motor case as defined in claim 1, wherein said sheet is a fiber reinforced material.

8. A motor case as defined in claim 7, wherein said sheet is a thermoplastic material.

9. A motor case as defined in claim 7, wherein said sheet is a thermoset material.

10. A motor case as defined in claim 1, wherein said case has a plurality of layers, and further wherein there is a circumferential gap between the position of said first end at said inner circumferential surface and the position of said second end at said outer circumferential surface to define a longitudinal section of said case which has one less layer than the remainder of said case, thereby predictably causing said case to fail along said longitudinal section if sufficient pressurization occurs within said case.

11. A motor case as defined in claim 7, and further comprising a second sheet of fiber reinforced composite material having said adhesive on at least part of said second sheet, said second sheet being rolled onto said case and bonded thereto, and further wherein said second sheet has a fiber orientation that is different from the fiber orientation of said case.

12. A method of manufacturing a roll-bonded motor case from a sheet of composite material for housing a propellant charge, comprising the steps of applying an adhesive to at least part of said sheet, said adhesive having a bond-strength breakdown temperature which is below the autoignition temperature of the housed propellant, rolling said sheet around a cylindrical tool to form a tubular case having at least one layer of material, and curing said case.

13. A method as defined in claim 12, wherein the step of rolling said sheet includes selectively forming a desired number of rolled layers in accordance with the desired case structural characteristics.

14. A method as defined in claim 12, wherein the step of rolling said sheet includes selectively locating the ends of said sheet relative to each other to selectively control the position and mode of failure of said case if sufficient internal pressurization occurs.

15. A method as defined in claim 13, wherein the step of rolling said material includes rolling the sheet onto a tool having a coefficient of thermal expansion which is greater than that of the sheet and heat curing said case while on said tool, thereby causing increased compaction of the case and providing a gap between the case and the tool after cool-down to enable easy removal of the case from the tool.

16. A method as defined in claim 13, further including the step of selecting said adhesive for applying on said sheet so that it has a bond-strength breakdown temperature which is approximately 50° F. below the autoignition temperature of the housed propellant.

17. A method as defined in claim 12, wherein said step of applying said adhesive includes selectively applying said adhesive at desired locations on said sheet.

* * * * *